United States Patent
Rauch et al.

(10) Patent No.: US 6,254,510 B1
(45) Date of Patent: Jul. 3, 2001

(54) COASTING DOWNSHIFT CONTROL STRATEGY FOR A MULTIPLE-RATIO AUTOMATIC TRANSMISSION

(75) Inventors: Gary Allen Rauch, Howell; Brian Michael O'Neil, Ann Arbor, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/532,586

(22) Filed: Mar. 22, 2000

(51) Int. Cl.$^7$ .................................................. F16H 59/36
(52) U.S. Cl. ............................................. 477/132; 477/148
(58) Field of Search .................................... 477/132, 148, 477/150

(56) References Cited

U.S. PATENT DOCUMENTS

| | | | |
|---|---|---|---|
| 5,586,029 | * 12/1996 | Schulz et al. | 477/53 |
| 5,642,283 | * 6/1997 | Schulz et al. | 477/68 |
| 5,809,442 | * 9/1998 | Schulz et al. | 701/51 |
| 5,835,875 | * 11/1998 | Kirchhoffer et al. | 701/51 |
| 5,954,776 | * 9/1999 | Saito et al. | 701/51 |
| 6,007,445 | 12/1999 | Kirchhoffer et al. | |

* cited by examiner

*Primary Examiner*—Dirk Wright
(74) *Attorney, Agent, or Firm*—Frank G. McKenzie (57) ABSTRACT

A control strategy for a multiple-ratio transmission for an automotive vehicle comprising a shift valve system that responds to shift valve signals developed by a microprocessor controller, the controller being in communication with engine sensors indicating engine operating variables and transmission sensors indicating transmission operating variables, the shift valve system responding to shift signals developed by the microprocessor during coasting downshift of the vehicle from one gear ratio to a lower gear ratio with a closed engine throttle whereby torque reversals are avoided during coast-down, thereby eliminating inertia torque changes to improve the smoothness of coasting downshifts during cold engine operation.

6 Claims, 7 Drawing Sheets

COASTING DOWNSHIFT CONTROL STRATEGY FOR A MULTIPLE-RATIO AUTOMATIC TRANSMISSION

TECHNICAL FIELD

The invention relates to coasting downshift controls for a multiple-ratio automatic transmission for an automotive vehicle.

BACKGROUND ART

In a multiple-ratio transmission having a hydrokinetic torque converter and multiple-ratio gearing, engine torque is delivered to the impeller of the converter as the turbine of the converter drives the input element of the multiple-ratio gearing. Shifts between ratios is controlled by a shift valve system. When the vehicle is coasting with the engine throttle closed, the shift valve system will effect coasting downshifts. At that time, the vehicle is traveling at a relatively low speed and the engine is at or near an idle state.

During a coasting downshift from a ratio in which a friction clutch is engaged to frictionally connect two elements of the gearing to a ratio in which a reaction element is held by a friction brake, the shift is characterized as a synchronous shift. That is, the clutch must be released in synchronism with the application of the brake. In such instances, the capacity of the clutch is in excess of the capacity that would be required during a coasting downshift. The brake, which is operated by a brake servo, has a higher pressure requirement.

The pressure requirement of the brake and the capacity of the clutch are designed to meet the requirements of the driveline during normal torque delivery. This, of course, results in excess capacity for the clutch during a coasting downshift when the driving torque is at minimal levels.

Such a synchronous downshift may result in a torque reversal in the driveline, which results in an audible torque disturbance as the powertrain experiences a transition from an operating mode in which the engine drives the wheels of the vehicle before the shift to an operating mode in which the wheels drive the engine after the shift. As the so-called lash in the transmission is traversed at the transition point, the shift feel may be objectionable, particularly when the torque disturbance is audible during a coasting downshift.

In those special instances in which the engine speed is decaying normally on a coasting downshift as the operator closes the engine throttle, the torque gradient from the torque delivery state to a coasting torque state will be slight, and the lash in the driveline will not result in an audible torque disturbance. On the other hand, if the oncoming friction brake "pulls" the output torque through the transition point as the torque direction is reversed, the torque gradient will be steep and the downshift quality will be unacceptable.

Transmissions typically are calibrated for optimal downshift points on a coasting downshift when the engine is operating at its normal operating temperature. During operation of the engine at low engine temperature following a cold start, however, the engine control strategy usually requires an increase in engine speed. This is done by increasing the duty cycle of a duty cycle controlled bypass air valve. The idle air bypass can be controlled in other ways, of course, other than by using a duty cycle controlled bypass air valve.

If the coasting downshift should occur while the engine is operating with an increased speed following a cold start, a synchronous coasting downshift typically is accompanied by a torque reversal at the operating mode transition point that may degrade the downshift quality.

DISCLOSURE OF INVENTION

The invention comprises a control system and strategy that permits coasting downshifts to occur with minimal torque disturbance. This is done by moving the downshift point so that the downshift point occurs when the vehicle speed is high enough to avoid a torque reversal. The downshift point adjustment is based upon the magnitude of the engine speed at the time of the downshift. The shift point is altered only when the desired engine speed is greater than the base idle speed; for example, when the base idle speed is increased following a cold start. The shift points are adjusted by using a shift point adder until the need for an increase in the desired engine speed is no longer present.

In practicing the invention, the engine speed is monitored, and the engine idle speed is increased to a value greater than normal idle speed during cold engine operation as the duty cycle for the duty cycle controlled idle bypass air valve is raised. Factors other than temperature also affect the idle speed. The speed ratio coasting downshift point is adjusted to a ratio in which a clutch is released to a lower ratio in which a brake is applied by adding to the normal coasting downshift vehicle speed point an incremental value whereby torque reversals in the driveline during coasting downshifts are avoided during cold engine operation.

BEST MODE FOR CARRYING OUT THE INVENTION

Figure 1A:
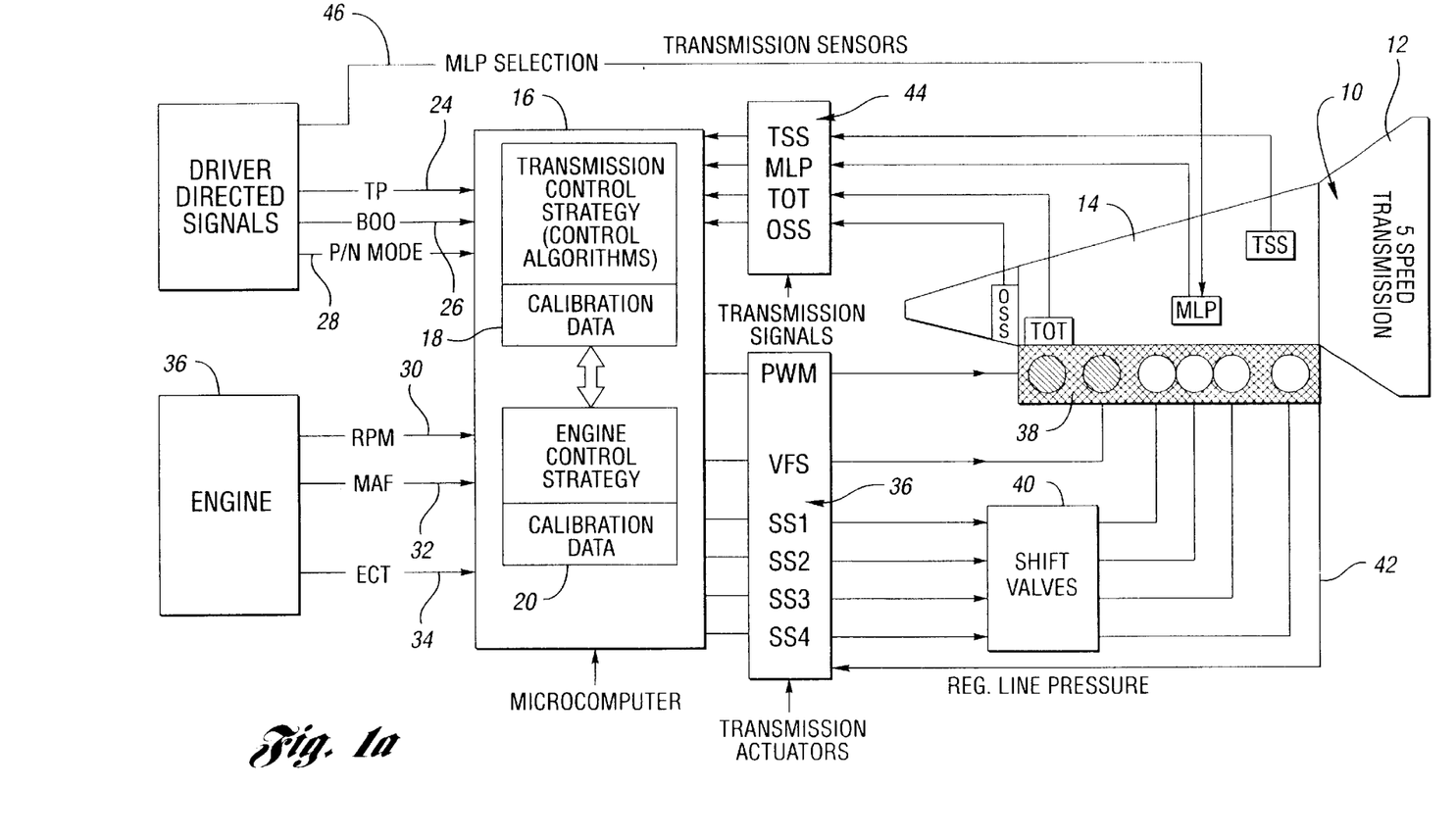
FIG. 1a is a schematic representation in block diagram form showing the principal elements of a multiple-ratio automatic transmission in a vehicle driveline.
Figure 1B:
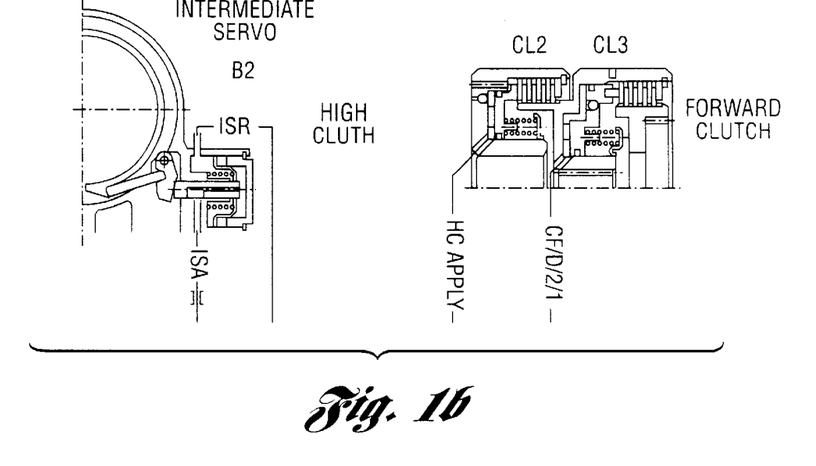
FIG. 1b is a schematic diagram showing an intermediate brake servo and a friction clutch which are involved in a 4–3 coasting downshift.

In FIG. 1a, the transmission 10 includes a hydrokinetic torque converter enclosed in a converter housing 12, multiple-ratio gearing enclosed in a gearing housing 14. The transmission of FIG. 1a and the control system for the transmission have features that are common to the transmission and control system of U.S. Pat. No. 6,007,445, which is assigned to the assignee of the present invention. Reference may be made to the '445 patent for the purpose of supplementing this disclosure. The disclosure of the '445 patent is incorporated herein by reference.

A microcomputer 16 for the transmission system includes transmission control strategy in transmission module 18 and engine control strategy in module 20. Driver-directed signals are distributed to module 18 including a throttle position signal TP at 24, a brake on/off switch signal at 26, and a park neutral mode switch signal (P/N mode) at 28. Engine speed signals (RPM) are developed by an engine speed sensor, as indicated at 30. A mass air flow meter signal MAF is delivered to module 20, as shown at 32, and an engine coolant temperature signal ECT is delivered to the module 20, as shown at 34. The engine itself is indicated at 35.

Transmission actuators 36 receive the output of the computer 16. These include a pulse-width modulated solenoid PWM, a variable-force solenoid VFS and shift solenoids SS1, SS2, SS3 and SS4. The PWM and VSF outputs are distributed to control valve body 38 of the transmission 10. The shift signals are distributed to a shift valve portion 40 of the transmission control valve body 38. An engine-driven pump in the valve body 38 develops a regulated line pressure in line pressure passage 42, which is distributed to the transmission actuators. Output signals from the transmission are fed back to the computer, as shown at 44.

The transmission sensor outputs include the turbine speed sensor signal TSS, a manual lever position signal MLP, the transmission operating temperature signal TOT, and the output shaft speed signal OSS. Vehicle speed is easily computed from the OSS signal. The driver selects the manual lever position, as shown at 46.

The gearing and the multiple torque flow paths now will be explained with reference to FIGS. 2a–2e.

The torque converter, which is enclosed in torque converter housing 12, is shown in FIGS. 2a–2e at 48. The gearing in gearing housing 14 includes a simple planetary gear unit 50 and a compound Simpson gear unit 52. Gear unit 50 has a carrier 54, which is connected to a turbine T of the torque converter 48. The engine-driven converter impeller is designated P.

The sun gear 56 for gear unit 50 is connected to brake drum 58 for friction brake 60. The coast clutch 62 connects the carrier 54 to the brake drum 58, and overrunning coupling OWC1 is disposed between ring gear 64 and the carrier 54 so that the ring gear 64 and the sun gear 56 are locked together, during forward torque delivery, to the gear unit 50. Brake band 60 is applied when the gear unit 50 is in an overdrive mode with the sun gear 56 acting as a reaction element.

Gear unit 52 comprises common front and rear sun gears 66 and 68, a front ring gear 70, a rear ring gear 72, and a carrier 74. Carrier 74 is adapted to be anchored by overrunning coupling OWC2 to the housing during forward drive operation in the lowest gear ratio.

Torque output shaft 76 is connected to the ring gear 72 and to carrier 78 of the forward gearset of the compound planetary gear unit 52. Overrunning coupling OWC2 anchors carrier 74 during normal low and second ratio forward-drive operation. Brake band 80 is applied to anchor the carrier 74 during reverse-drive operation.

During second ratio operation, brake band 82 is applied to brake drum 84, which anchors the common sun gears 66 and 68. Direct clutch 86 is engaged to connect ring gear 70 to brake drum 84. Forward friction clutch 88 connects the ring gear 64 to ring gear 70.

Overrunning coupling OWC1 locks the carrier 54 to ring gear 64 during operation in first, third and fourth ratios.

Figure 2A:
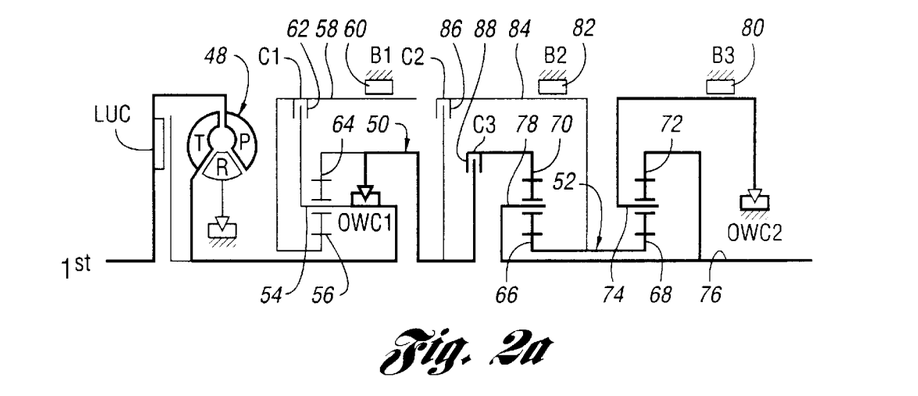
FIGS. 2a, 2b, 2c, 2d and 2e are schematic gearing diagrams for a five-speed transmission in which the power flow path is demonstrated for each of five forward-driving ratios.

FIG. 2a shows the torque flow path during operation in the first gear ratio. The heavy, solid lines indicated in FIGS. 2a–2e represent the elements that are subjected to driving torque.

To establish first gear ratio (FIG. 2a), turbine torque is delivered through overrunning coupling OWC1 to the forward clutch 88. Clutch 88 is engaged during forward drive operation in each of the five forward-driving ratios. Thus, input torque is delivered to the ring gear 70 during first ratio operation as carrier 74 is anchored by the overrunning coupling OWC2. Torque is transferred through the front and rear gearsets of the Simpson gear unit 52 to the output shaft 76.

Figure 2B:
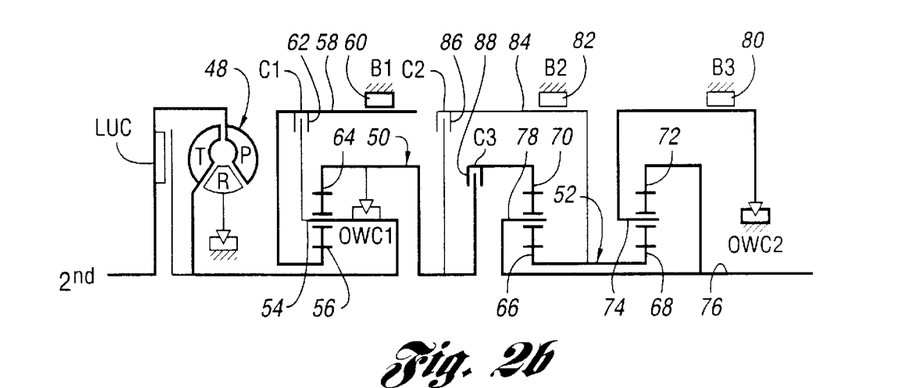

To achieve a shift to the second ratio, brake 60 is applied, thereby anchoring sun gear 56 of the gear unit 50. Gear unit 50 thus assumes an overdrive state in second gear ratio, as indicated in FIG. 2b.

Figure 2C:
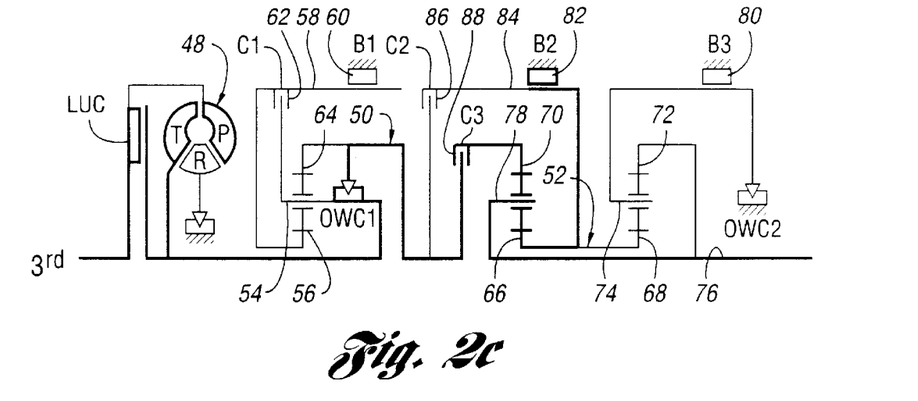

Third ratio is accomplished by releasing brake 60 and applying brake 82. Thus, sun gears 66 and 68 act as a reaction point. Turbine torque then is delivered through the overrunning coupling OWC1 and through the forward clutch 88 to the ring gear 70.

Figure 2D:
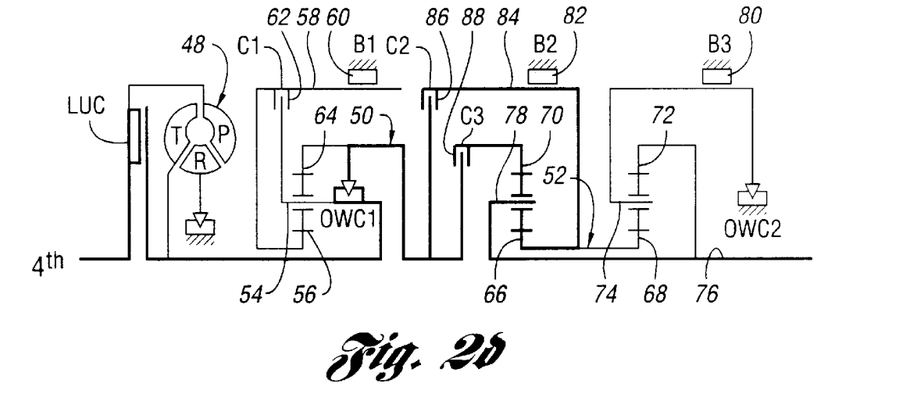

Fourth ratio is obtained by releasing brake band B2 and applying clutch 86. Since both clutches 86 and 88 are applied, the gear ratio through the planetary gear unit 52 is unity. Overrunning coupling OWC1 continues to deliver torque. This shift from the third ratio to the fourth ratio thus is a synchronous shift that involves release of brake band 82 and application of friction clutch 86.

Figure 2E:
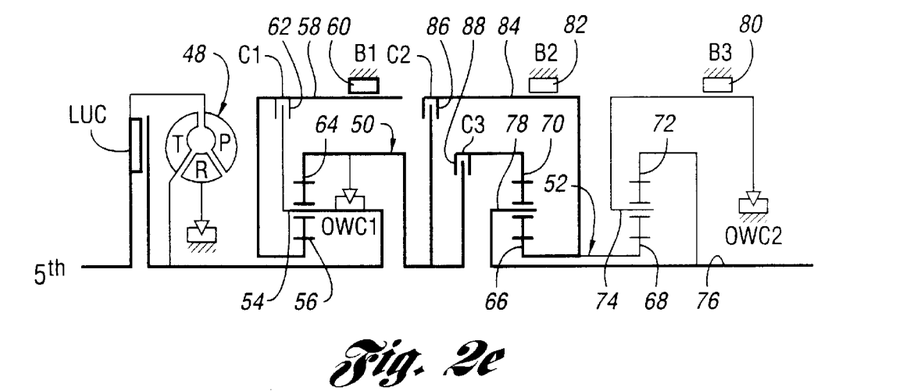

Fifth ratio is achieved by anchoring the sun gear 56 of the simple planetary gear unit 50 so that it assumes the overdrive mode.

In calibrating downshift points, engine speed data is plotted against turbine speed to determine at what vehicle speed the transmission changes from coasting to the torque transmitting drive mode. This is done as the engine speed is held constant at any given speed level. If the turbine speed is greater than the engine speed, the transmission will be overrunning and the powertrain will not deliver torque. Conversely, if the turbine speed is less than the engine speed, the transmission is engaged and is capable of delivering torque to the wheels. This data is obtained for the purpose of practicing the present strategy and is represented for first, third and fourth ratios by the plots in FIGS. 4, 5 and 6, where the ratio of turbine speed to engine speed is represented by drive shaft torque, i.e., positive torque when engine speed exceeds turbine speed, and negative torque (zero on the plot) when turbine speed exceeds engine speed.

Figure 4:
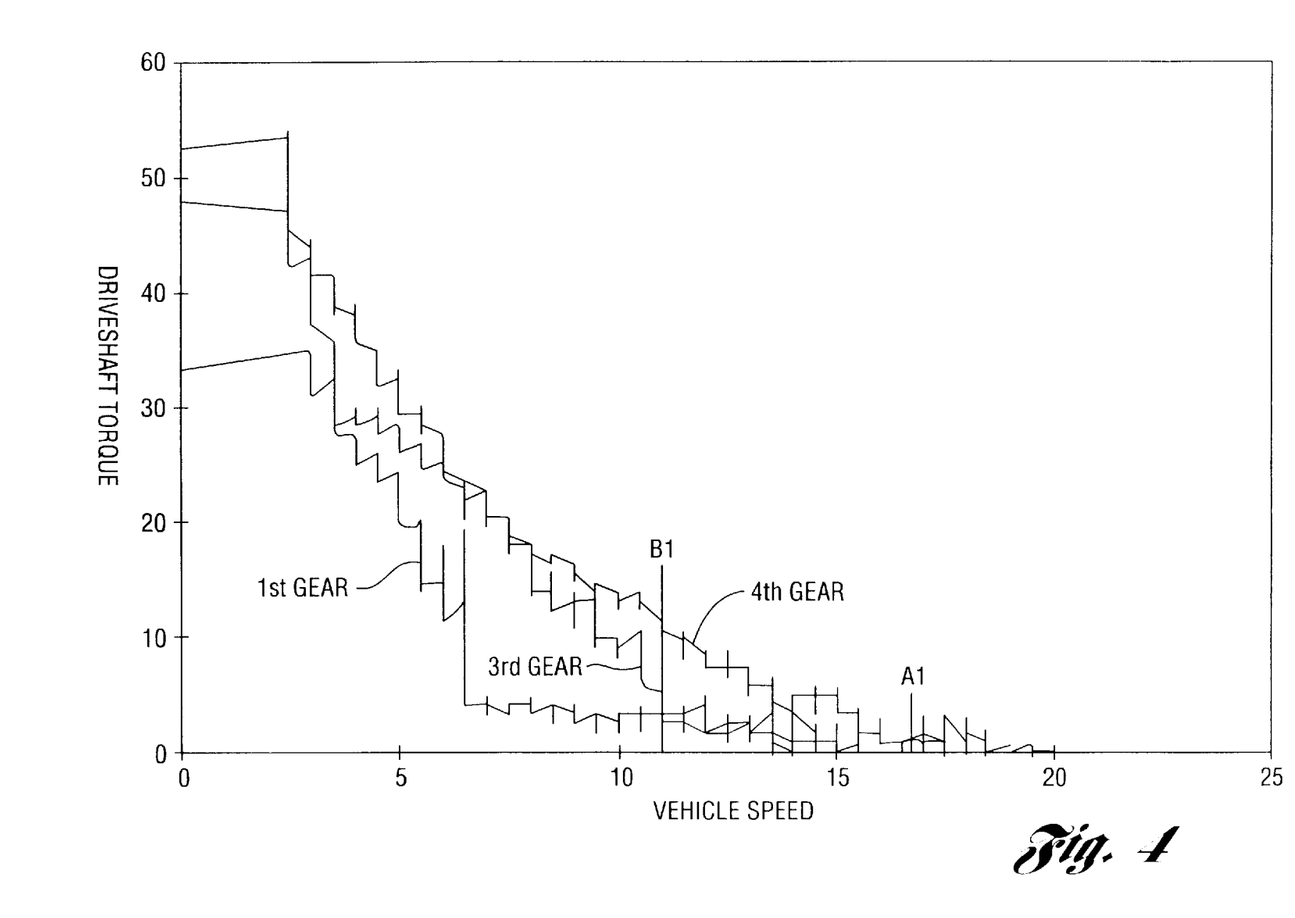
FIG. 4 is a plot of vehicle speed versus output shaft torque under coasting downshift conditions with the engine operating at a base idle speed, such as 700 rpm.
Figure 5:
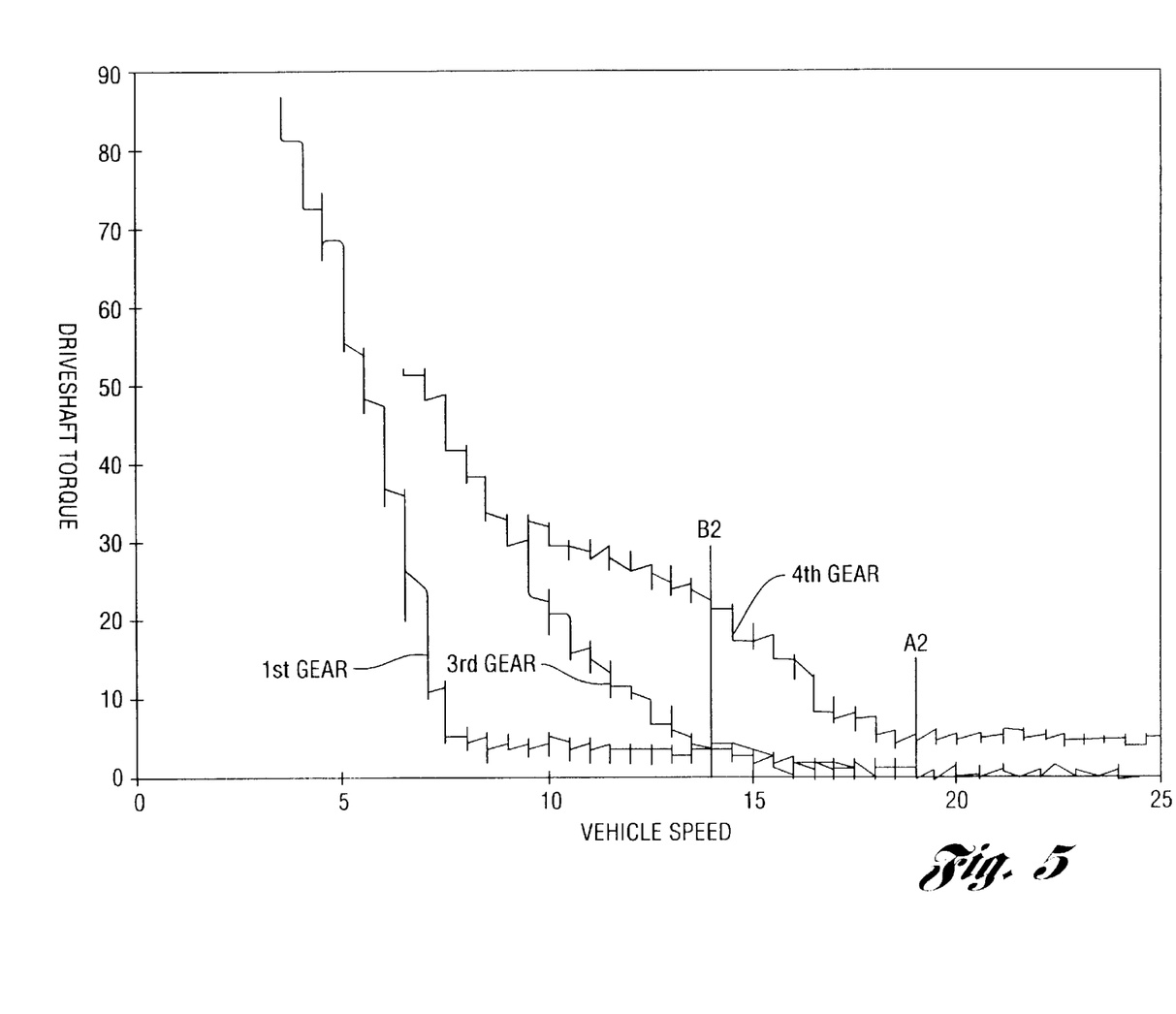
FIG. 5 is a plot similar to Figure with the engine speed advanced to 900 rpm.
Figure 6:
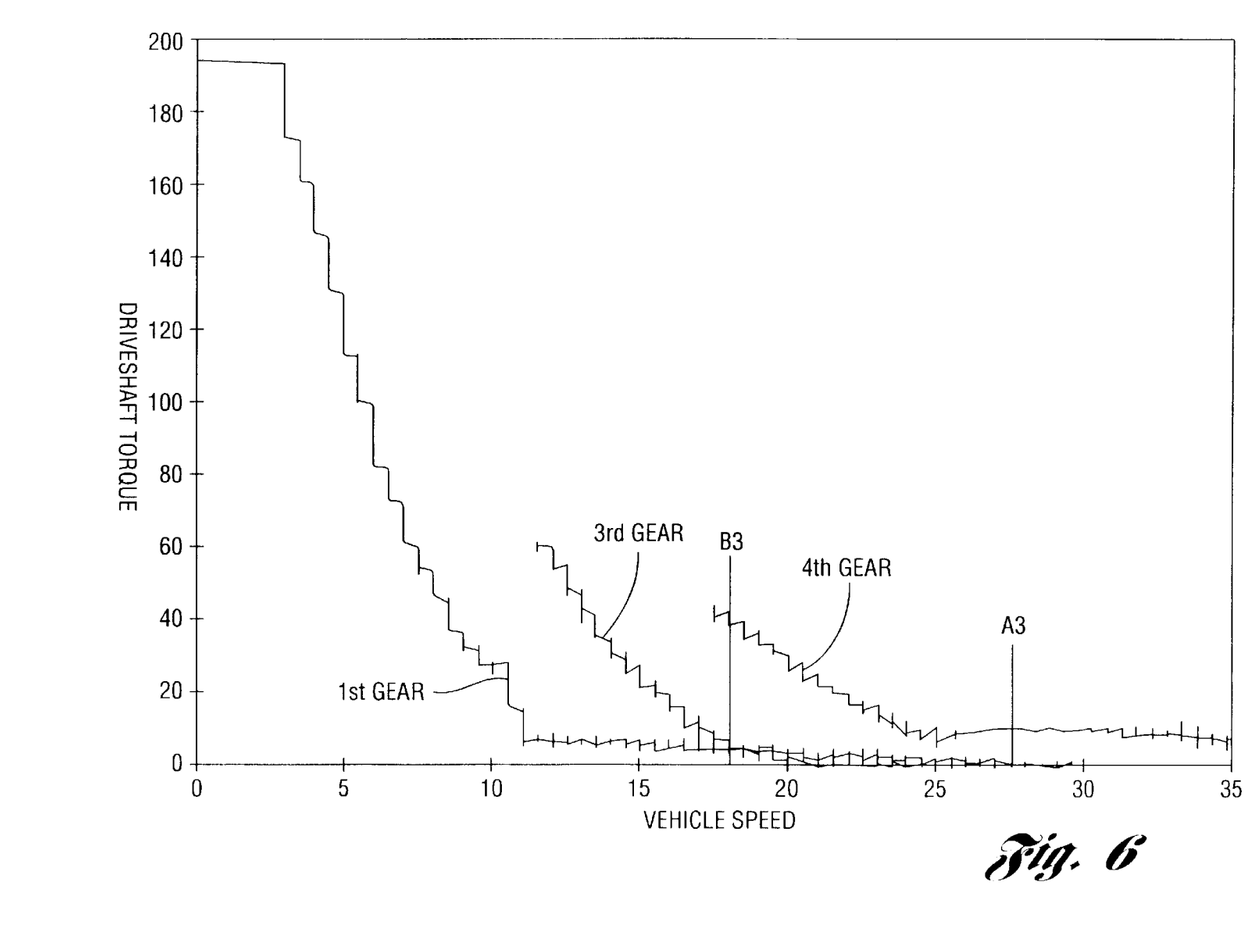
FIG. 6 is a plot similar to FIG. 4 showing a coasting downshift torque relationship when the engine speed is 1200 rpm.

The plots of FIGS. 4, 5 and 6 are made at various engine speeds. FIG. 4 shows a coasting downshift torque curve representing drive shaft torque versus vehicle speed for each of three gears, i.e., the first gear, the third gear and the fourth gear. The strategy of the invention is particularly pertinent to a 4–3 coasting downshift and a 3–1 coasting downshift.

In the plot of FIG. 4, which represents the torque versus vehicle speed relationship with the engine held at a constant speed of 700 rpm. The torque on the output shaft is zero at speeds greater than about 17 mph. This is designated by the symbol A1. If the turbine speed is greater than engine speed, the transmission overruns, as explained previously. If the turbine speed is less than the engine speed, the transmission transmits torque, as explained previously. Thus, there is zero output shaft torque at vehicle speeds greater than 17 mph when the engine speed is held at 700 rpm.

When the turbine speed is less than the engine speed, the transmission is engaged. This occurs at point A1. This, then, is the optimal coasting downshift point for a coasting 4–3 downshift.

The strategy of the present invention is not required on the 5–4 coasting downshift because that shift is a nonsynchronous shift with imperceptible inertia torque disturbances. A 4–3 downshift, however, involves the application of brake band 82 and release of clutch 86, which is a synchronous downshift. A 3–1 downshift is a nonsynchronous shift because it involves release of brake band 82 and application of overrunning coupling OWC2.

In the case of a 4–3 synchronous coasting downshift, optimum shift feel is achieved by executing either a drive-to-drive or a coast-to-coast shift event. This characteristic is illustrated best by referring to FIG. 3 where vehicle speed is plotted against engine rpm. In the region referred to in FIG. 3 as a coast-to-coast shift, the impeller speed or the engine speed is less than the turbine speed, both before and after the shift. A coast-to-coast 4–3 coasting downshift, then, should occur at a vehicle speed greater than shift point V2 in FIG. 3. This point corresponds to point A1 in the plot of FIG. 4.

If the 4–3 shift occurs below shift point V1 in FIG. 3, that shift would be a drive-to-drive shift since both the turbine speed for fourth ratio and the turbine speed for third ratio at shift points below V1 are both below the corresponding impeller speed curves.

A 4–3 coasting downshift could be executed at speeds less than $B_1$, but that would make it difficult to obtain an optimal 3–1 coasting downshift. Since the 3–1 coasting downshift is a nonsynchronous shift, as explained above, optimum shift feel is obtained only when the shift is a drive-to-coast shift or a coast-to-coast shift. A drive-to-coast shift is obtained when the vehicle speed is between shift points V1 and V2, as indicated in FIG. 3, but experience has shown that a coast-to-coast 3–1 coasting downshift provides optimal downshift. Such a coast-to-coast 3–1 coasting downshift can be achieved at speeds above point V1 in FIG. 4. Thus for optimal coasting downshifts, 4–3 coasting downshifts should be made above point V2 and 3–1 coasting downshifts should be made above point V1.

Figure 3:
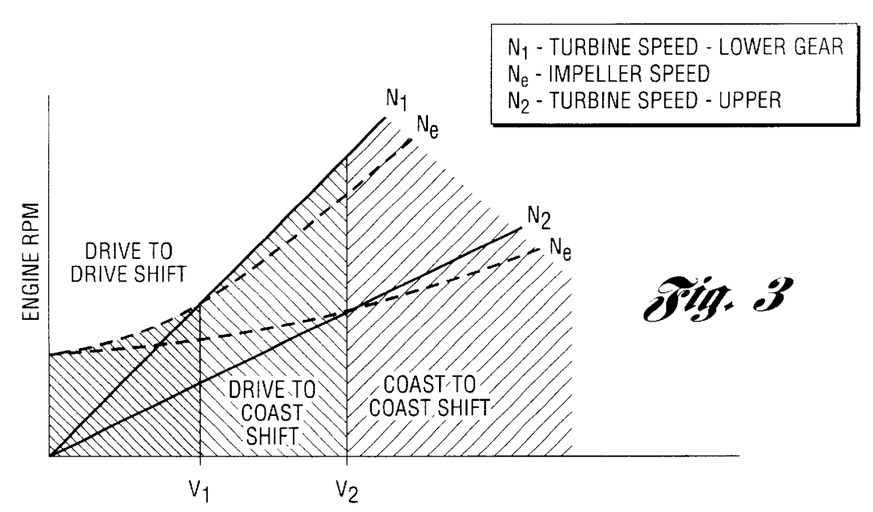
FIG. 3 is a plot showing the relationship between vehicle speed and engine rpm for a coasting downshift.

The coasting 3–1 downshift is a nonsynchronous downshift, so it can be made without driveline inertia disturbances between shift points V1 and V2 in FIG. 3.

In the plots of FIGS. 4, 5 and 6, each plot is made at a different engine speed. In each of the plots, the points shown at A1, A2 or A3 and at B1, B2 or B3 define the boundaries for the optimal coast downshift points. These boundaries change as engine speed changes. As engine speed increases, these points move to the right. Point A1 in FIG. 4, where the engine is at about 700 rpm, is at approximately 17 mph. When the engine speed is 900 rpm, as seen in FIG. 5, point A2 is at approximately 19 mph. When the engine is operating at 1200 rpm as seen in FIG. 6, point A3 is at approximately 27 mph.

The strategy of the present invention will move the downshift point based upon the engine speed at the time of the downshift. Since the engine speed at engine idle is greater when the engine is in a cold-start mode, the coasting downshift points are moved accordingly.

The altering of the shift schedule occurs only when the engine is in an operating mode with a minimal throttle setting following a cold start. This eliminates problems that would be associated with delayed upshifts if the strategy of adjusting the coasting downshift points were to be used during normal engine operation after cold start conditions no longer exist.

Typically, the 3–4 upshift point must be higher than the 4–3 downshift point in order to achieve the desired hysteresis. Thus, if the coasting downshift point were to be adjusted using the strategy of the present invention under operating conditions other than operation following a cold start, the 3–4 upshift point would be too high.

Figure 7:
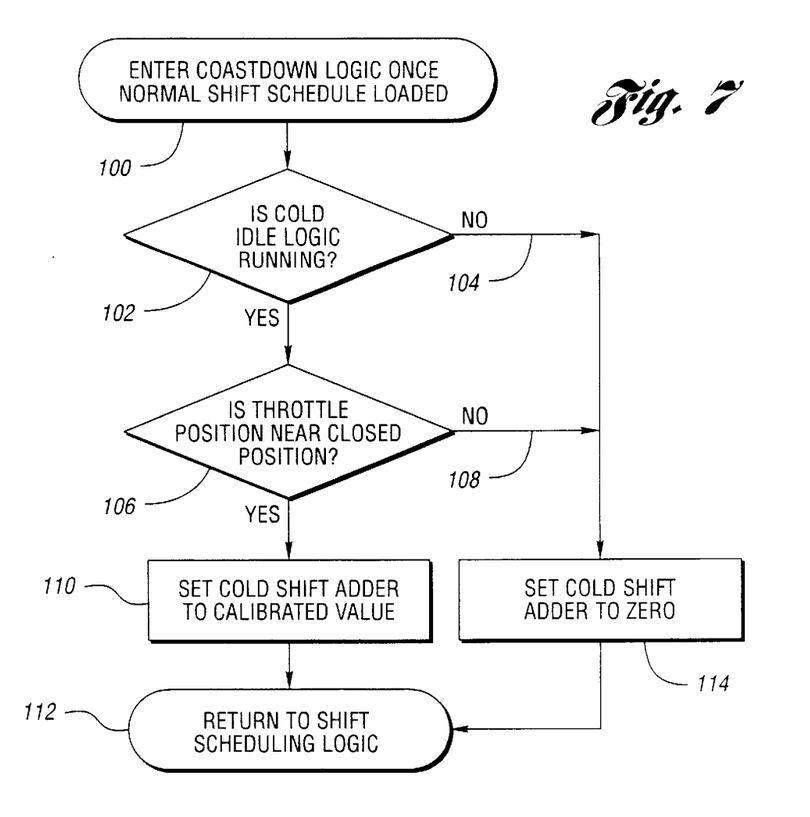
FIG. 7 is a simplified flowchart indicating the coasting downshift strategy for a friction brake and a friction clutch on a coasting synchronous downshift for the brake and the clutch shown in FIG. 1b.

FIG. 7 shows a summary in flow diagram form of the coasting downshift strategy. The coast-down logic is entered into the module 18 of the microcomputer 16, together with a normal shift schedule, as shown at 100 in FIG. 7. During the execution of the cold coast-down software logic, an inquiry is made at 102 as to whether the cold idle logic is running. That is, it is determined at 102 whether the engine idle speed has been increased because of a low temperature signal by the engine at the engine coolant temperature sensor 34.

If the cold idle logic is not running, the routine exits at 104. If the cold idle logic is running, a determination is made at 106 as to whether the throttle is near the closed throttle position. If the throttle is open beyond a minimal setting, the routine exits at 108. If the throttle position is at or near closed throttle, a cold start adder term is added to the shift point at 110 so that the shift point will occur at a higher vehicle speed in order to allow the shift point to take place at zero upward shaft torque, as demonstrated in the plots of FIGS. 4, 5 and 6. The amount of the shift point adder term is consistent with the increased engine speed that results from the cold engine conditions. The routine then returns to the shift scheduling logic at the beginning of the control loop, as shown at 112. This process continues until it is detected at 102, whether the cold idle logic is still running. If it is not running, the routine exits at 104, as indicated previously. The shift point adder term, which was used at action block 110, is reset to zero, as shown at action block 114. The shift point adder term is set to zero also if it is indicated at 106 that the throttle position is not near the closed position. This is seen at 108.

Although a preferred embodiment of the intention has been described, it will be apparent to persons skilled in the art that modifications may be made without departing from the scope of the invention. All such modifications and equivalents thereof are intended to be covered by the following claims.

What is claimed is:

1. A downshift strategy and method for controlling coasting downshifts of a multiple-ratio automatic transmission in an automotive vehicle driveline including a throttle-controlled engine, the transmission having multiple-ratio gearing, clutches and brakes establishing plural torque flow paths through the gearing and shift valves for activating and deactivating the clutches and brakes;

the method comprising the steps of:
monitoring the engine speed during cold engine operation and increasing the engine idle speed to a value greater than a normal value in response to engine operating conditions including a temperature signal indicating temperature lower than a predetermined value;
adjusting the speed ratio coasting downshift vehicle speed corresponding to a ratio change from a ratio in which a clutch is released to a lower ratio in which a brake is applied by adding to a normal coasting downshift vehicle speed an incremental coasting downshift vehicle speed whereby torque reversals in the driveline during coasting downshifts are avoided during cold engine operation at increased engine speeds.

2. A coasting downshift strategy and method for controlling downshifts of a multiple-ratio automatic transmission in an automotive vehicle driveline including a torque converter having an impeller driven by a throttle-controlled engine and a turbine, the transmission having multiple-ratio gearing driven by the turbine, clutches and brakes establishing plural torque flow paths through the gearing and shift valves for activating and deactivating the clutches and brakes;

the method comprising the steps of:

monitoring the engine speed during cold engine operation and increasing the engine idle speed to a value greater than a normal value in response to engine operating conditions including a temperature signal indicating engine temperature lower than a predetermined normal value;

adjusting the speed ratio coasting downshift vehicle speed point corresponding to a ratio change from a ratio in which a clutch is released to a lower ratio in which a brake is applied by adding to a normal coasting downshift turbine speed an incremental turbine speed whereby reversals in torque in the driveline during coasting downshifts are avoided during cold engine operation at increased engine speeds.

3. The coasting downshift strategy and method set forth in claim 2 wherein the engine speed before the coasting downshift is less than the turbine speed before the coasting downshift, and wherein the impeller speed after the coasting downshift is less than the turbine speed after the coasting downshift, thus effecting a coast-to-coast downshift.

4. A downshift strategy and method for controlling coasting downshifts of a multiple ratio automatic transmission in an automotive vehicle driveline including a torque converter having an impeller driven by a throttle-controlled engine and a turbine, the transmission having multiple-ratio gearing driven by the turbine, clutches and brakes, including an overrunning brake that is activated during operation in low ratio, for establishing plural torque flow paths through the gearing and shift values for activating and deactivating the clutches and brakes;

the method comprising the steps of:

monitoring the engine speed during cold engine operation and increasing the engine idle speed to a value greater than a normal value in response to engine operating conditions including a temperature signal indicating temperature lower than a predetermined normal value;

adjusting the speed ratio coasting downshift vehicle speed point corresponding to a ratio change from a ratio in which the one brake is applied by adding to the coasting downshift turbine speed an incremental turbine speed whereby torque reversals in the driveline during a drive-to-coast downshift are avoided during cold engine as the overrunning brake is activated and the one brake is released.

5. The coasting downshift strategy and method set forth in claim 1 wherein the coasting downshift is characterized by a coast-to-coast ratio change wherein the engine speed both before and after the downshift is less than the speed of a torque input element of the gearing.

6. The coasting downshift strategy and method set forth in claim 2 wherein the coasting downshift is characterized by a coast-to-coast ratio change wherein the impeller speed both before and after the downshift is less than the speed of the turbine.

* * * * *